July 19, 1932.  H. L. JOYCE  1,867,843
POWER TRANSMISSION APPARATUS
Filed Feb. 2, 1931  2 Sheets-Sheet 1

Witness:
William P. Kilroy

Inventor:
Harold L. Joyce
By Hill & Hill
Att'ys

July 19, 1932.  H. L. JOYCE  1,867,843
POWER TRANSMISSION APPARATUS
Filed Feb. 2, 1931   2 Sheets-Sheet 2
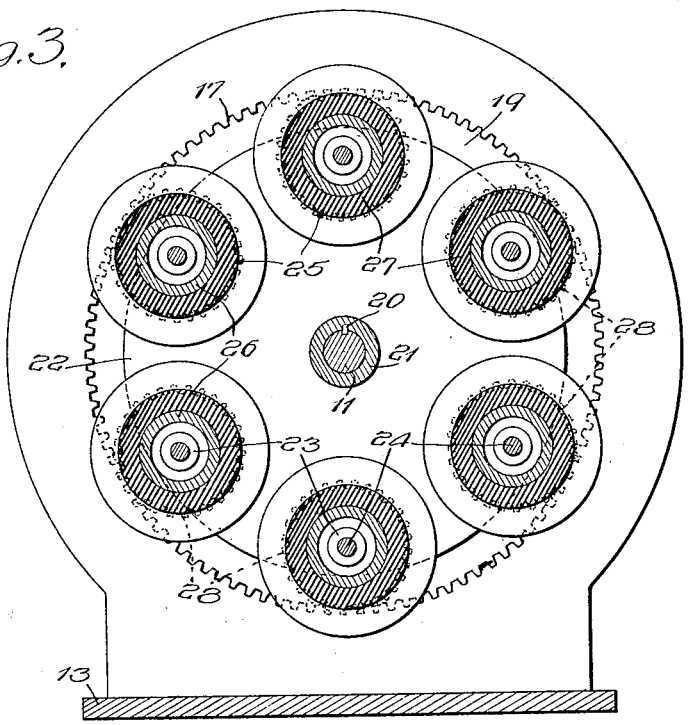
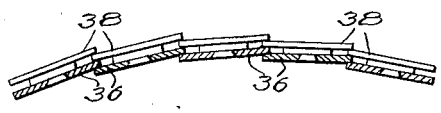
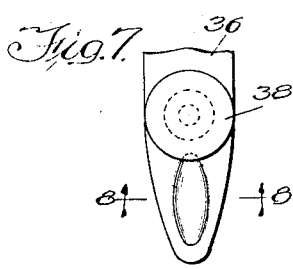
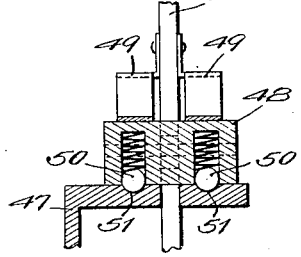
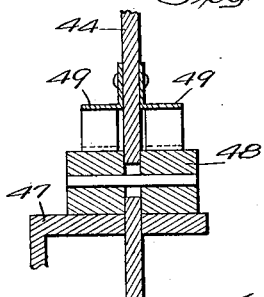
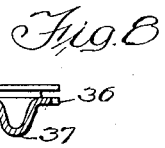
Inventor:
Harold L. Joyce
By Hill & Hill Patented July 19, 1932

1,867,843

UNITED STATES PATENT OFFICE

HAROLD L. JOYCE, OF EVANSTON, ILLINOIS

POWER TRANSMISSION APPARATUS

Application filed February 2, 1931. Serial No. 512,866.

This invention relates to power transmission apparatus, and particularly to a novel construction and arrangement whereby power may be transmitted from a driving element to a driven element at various speeds in either direction or at the same speed as desired.

One object of the present invention is to provide a construction and arrangement wherein the respective connecting parts between the driving and driven elements may be relatively positioned by the manipulation of a single operating device for transmitting motion from the driving element to the driven element at various speeds in either direction, or the driven element may be permitted to remain stationary while the driving element continues in motion.

Another object of the invention is to provide a construction and arrangement wherein the connecting parts may be relatively positioned by a single operating device for transmitting motion from the driving element to the driven element at various reduced speeds in either direction, at uniform speed in the same direction, or the driven element may be permitted to remain stationary and the driving element to continue in motion while the respective connecting parts remain in engagement.

Another object of the invention is to provide a transmission apparatus having axially aligned driving and driven elements associated therewith, and connecting means operatively related to one of said elements and cooperable with connecting means associated with the other element whereby the speed ratio of the respective connecting means in the illustrative embodiment may be varied without the interchanging or act of meshing gears.

Another object of the invention is to provide connecting parts associated respectively with the driving and driven elements, certain of said parts being formed of yieldable material and other of the parts having protuberances adapted to engage and indent the yieldable material in a manner to provide an efficient driving connection.

Another object of the invention is to provide planetary gear driven elements mounted on the drive shaft in fixed relation thereto and resilient fingers mounted on the driven shaft adapted to cooperate with said members for establishing a driving connection between said shafts.

A further object of the invention is to provide means for urging said fingers toward said members.

A still further object of the invention is to improve devices of the character described in sundry details hereinafter referred to and particularly pointed out in the appended claims.

One embodiment of the present invention is shown for illustrative purposes in the accompanying drawings, in which Fig. 1 is a longitudinal sectional elevation of a transmission apparatus illustrating an embodiment of the present invention, and showing portions of the device in changed position as indicated in dotted lines;

Fig. 3 is a transverse sectional elevation of a portion of the connecting means taken as indicated by the line 3—3 of Fig. 1.

Fig. 4 is an enlarged fragmentary sectional view of a portion of the connecting means taken substantially as indicated by the line 4—4 of Fig. 1;

Figures 1, 2, 9:
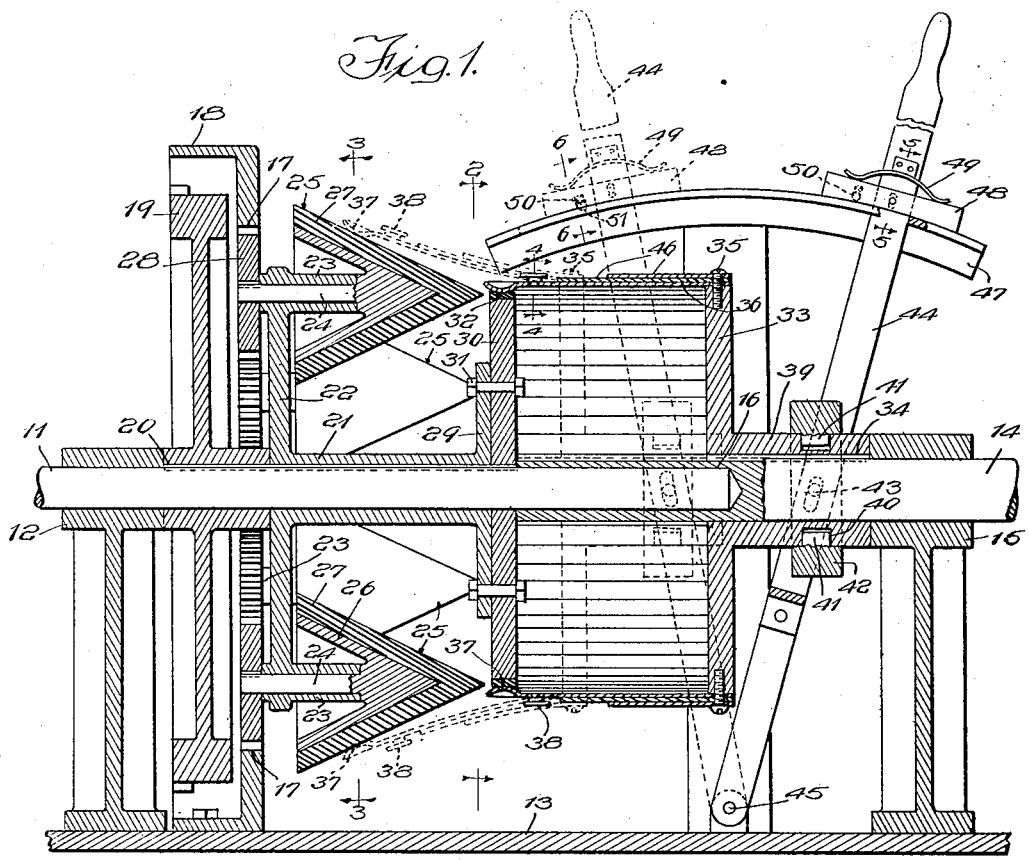
Fig. 2 is a transverse sectional elevation taken as indicated by the line 2—2 of Fig. 1.

Figs. 5 and 6 are fragmentary sectional views of a portion of the means for controlling the operation of the device, and are taken substantially as indicated by the lines 5—5 and 6—6, respectively, of Fig. 1, Fig. 6 being shown as if the control lever were in the dotted line position shown in Fig. 1;

Fig. 7 is an enlarged fragmentary face view of the free end of one of the fingers forming a part of the connecting means;

Fig. 8 is a transverse sectional view taken as indicated by the line 8—8 of Fig. 7; and Fig. 9 is an enlarged fragmentary sectional view through portions of the connecting means associated with the respective shafts and illustrating the manner of engagement to provide an efficient driving connection.

In the illustrative embodiment shown in the drawings, 11 designates a driving shaft or element journaled in a bearing 12 mounted on a suitable base 13 typifying the chassis of an automobile or portion of other device on which the transmission may be supported and in connection with which it may be used, while 14 designates a driven element or shaft shown in the present instance as positioned in axial alignment with the drive shaft and journaled in a bearing 15 also mounted on the base 13, the inner end of the shaft 14 being provided with a longitudinally extending recess or bore 16 adapted to receive the adjacent end of the drive shaft 11 for maintaining the shafts in alignment and in a manner to effectually support the mechanism positioned between the bearings 12 and 15.

Suitably mounted on the base 13 and surrounding the drive shaft 11 is an internal gear 17 having a laterally extending flange 18 adapted to surround a combined gear and fly wheel 19 secured to the drive shaft 11 by means of a key 20 for driving the shaft 11 from any suitable source of power (not shown).

Mounted on the drive shaft 11 and secured thereto by means of the key 20 is a sleeve 21 having a radially extending flange 22 adjacent one of its end portions, the flange 22 being provided adjacent its periphery with a plurality of annularly spaced bearings 23 adapted to receive short shafts 24 operatively related at one of their end portions to a plurality of planetary cone-shaped members 25, each comprising an inner portion 26, to which the shaft 24 is connected, and an outer portion 27 formed of compressible or yieldable material such as soft rubber, or the like, the apexes of the members 25 being positioned toward the driven end of the apparatus while the base of the members are positioned adjacent the flange 22. Secured to the opposite end portion of the shafts 24 are pinions 28 having a pitch diameter substantially less than the greatest diameter of the cone-shaped members 25, the said pinions being adapted to cooperate with the internal gear 17 in a manner to rotate the members 25 as the sleeve 21 and associated bearings 23 are carried around the axial line of and with the shaft 11 by the rotation thereof when driven by the fly wheel 19.

At the opposite end portion of the sleeve 21 is a flange 29 to which a radially extending collar 30 is secured by means of bolts 31, the collar 30 being provided with a peripheral portion 32 formed of yieldable material such as soft rubber, or the like.

For establishing an operative driving connection between the drive shaft 11 and driven shaft 14, a bracket 33 is splined on the driven shaft 14 in a manner to permit longitudinal movement of the bracket thereon, and to secure the bracket against rotary movement with respect thereto by means of a key 34. Mounted on the outer edge of the bracket 33 and secured thereto, adjacent one of their end portions, by means of screws 35 are a plurality of substantially parallel annularly spaced overlapping inwardly pressed resilient fingers 36 positioned with respect to each other and to said bracket in a manner to form an expansible member or drum having an open end portion adapted, under certain conditions, to receive and surround the members 25 and collar 30, the ends of the fingers 36 adjacent the open side of the drum being provided with inwardly extending protuberances or teeth 37 shown in the present instance as formed integral with the fingers, thus providing, in effect, a resilient internally toothed gear of variable pitch diameter capable of changing its effective pitch diameter under varying conditions of contact with a cooperating member, such for example, as the members 25.

For maintaining the fingers 36 in overlapping position in a manner to reinforce and stiffen each other, and in annular relationship with respect to each other, each of the fingers adjacent its free end portion and preferably on its outer side is provided with a locking device comprising preferably a button 38 of a diameter substantially equal to the width of the finger and suitably spaced from the outer face of the fingers in a manner to receive between the button and finger at one side thereof, the edge of an adjacent finger, and at its opposite side, the edge of a button mounted on an adjacent finger, as clearly shown in Fig. 4.

For moving the bracket 33 longitudinally of the shaft 14, and the protuberances 37 into various positions with respect to the members 25 and collar 30, a sleeve portion 39 of the bracket is provided with an annular groove 40 adapted to receive inwardly extending trunnions 41 formed on a ring 42 surrounding the sleeve and connected by means of a pin 43 to an operating lever 44 pivotally mounted at 45 on the base 13.

It will be observed from the foregoing description that when the protuberances 37 of the fingers 36 are in engagement with the periphery of the collar 30, and the associated parts are in the position shown in full lines in Fig. 1 of the drawings, the tension of the fingers 36 will cause the protuberances 37 to press against and indent the yieldable peripheral portion 32 of the collar 30 in a manner to form tooth-like portions between the protuberances and establish an efficient driving connection between the collar and the fingers, the pressure of the fingers on the collar being reenforced by means of leaf springs 46 positioned on the outside of the respective fingers and acting to urge the free ends of the fingers toward the shafts 11 and 14. In the position just described, the driving and driven elements are directly connected and the shaft 14 will be driven at the same speed and in the same direction as the shaft 11.

If a lower speed is desired, the operating lever 44 may be moved to the left toward the dotted line position shown in Fig. 1 to position the protuberances 37 in engagement with the yieldable material 27 of the members 25 in a manner to cause the protuberances to indent the yieldable material 27 and form tooth-like portions 25a in the material 27 between the protuberances engaging the members 25, as clearly shown in Fig. 9 to establish an efficient driving connection therewith.

It will be observed that the apexes of the members 25 are positioned adjacent the periphery of the collar 30 and that the protuberances 37 of the fingers may be readily moved onto the members 25 and that with the protuberances engaging the members 25 closely to the apex thereof, a driving connection between the shafts 11 and 14 will be established to drive the shaft 14 in the same direction as the shaft 11 and at only slightly reduced speed. This is due to the fact that the diameter of the member 25 where the protuberances 37 engage is materially less than the pitch diameter of the pinions 28, and it will be observed that as the shaft 11 is rotated in one direction to revolve the members 25 around the axial line thereof, the pinions 28 by reason of their engagement with the stationary internal gear 17 will be rotated around their respective axes in the opposite direction, and that the peripheral speed of the members 25 at their point of engagement with the protuberances 37 will be substantially less than the peripheral speed of the pitch line of the gears 28, and that, although the members 25 are rotating in the opposite direction, they will act upon the fingers 36 in a manner to rotate the shaft 14 in the same direction as the shaft 11, but at reduced speed.

It will be observed also that further movement of the lever 44 to the left will cause the fingers 36 to flex outwardly, thus expanding that portion of the drum adjacent the members 25, thereby changing the speed ratio between the drum and cone-shaped members. Such movement of the lever 44 will cause the protuberances to engage the members 25 at points or positions on their surfaces where the diameter is greater than that just described, and that the speed of the shaft 14 will be correspondingly reduced until the protuberances have been moved to the position shown in dotted lines in Fig. 1 where they will engage the members 25 at a point where the diameter of the cone-shaped member is substantially equal to that of the pitch line of the pinions 28 thus obtaining a "neutral" position, or, in other words, a position where no movement of the drive shaft 11 will be transmitted to the driven shaft 14 owing to the fact that the peripheral speed of the members 25 at the point indicated is the same as the speed at the pitch diameter of the pinions 28, thus causing the members 25 to merely roll around the interior of the open edge portion of the drum without transmitting any movement thereto. Thus, it will be observed that while operating between the dotted line position shown in Fig. 1 and the small end of the members 25, the drum and shaft 14 may be driven at various reduced speeds in the same direction as the driving shaft 11.

If the protuberances 37 of the fingers 36 are moved beyond the position shown in dotted lines in Fig. 1, toward the base of the members 25, they will engage the members at positions or points where the diameter of the members 25 is greater than at the point just described and where the peripheral speed of the members 25 at their points of contact with the protuberances is greater than that of the pitch diameter of the pinions 28, thus it will be observed that by reason of the rotation of the members 25 in the opposite direction to that in which the driving shaft 11 is rotating will cause the fingers 36 and shaft 14 to be moved in the same direction of rotation as the members 25, thus rotating the driven shaft 14 in a direction opposite to the rotation of the drive shaft 11, and that as the protuberances are moved further toward the enlarged end of the members 25, the speed of rotation of the shaft 14 in the opposite direction to that of the shaft 11 is gradually increased until the protuberances are in a position to engage the members 25 at their greatest diameter.

For maintaining the operating lever 44 in various positions to obtain the various relative speeds in either direction which may be transmitted through the connecting mechanism in the manner just described, a segment 47 is shown in the present instance as mounted on the base 13, and the lever 44 is provided with a friction block 48 adapted to frictionally engage the surface of the segment 47 in a manner to retain the lever 44 at various desired positions throughout its range of movement, the block 48 in the present instance being urged toward the segment 47 by means of leaf springs 49 mounted on opposite sides of the lever 44 as clearly shown in Figs. 1, 5 and 6.

It may be found desirable to readily locate the "neutral" position of the operating lever 44, or the position shown in dotted lines in Fig. 1, where movement of the shaft 11 is not transmitted to the shaft 14 although the protuberances 37 are in contact with the members 25, and for readily detecting this position, the block 48 is provided with spring pressed ball detents 50, as clearly shown in Fig. 6, adapted to engage depressions or recesses 51 formed in the surface of the segment 47, it being understood that when the balls 50 engage the depressions 51, slight resistance to the further movement in either direction of the lever 44 will be encountered to indicate the neutral position, but such resistance may be readily overcome for continuing the movement of the lever by slightly increasing the force exerted thereon.

It will be observed from the foregoing description that the present invention provides a novel construction and arrangement whereby power may be transmitted from a driving to a driven element at various speeds in either direction or at the same speed in the same direction and that such speeds may be readily controlled by the operation of a single device.

It will be further observed that the invention provides novel connecting means between the driving and driven elements wherein a portion of the connecting means associated with one of the elements is adapted to be pressed into and indent the portion of the connecting means associated with the other element in a manner to provide a most effective driving connection, and that the respective portions of the connecting means may be positioned with respect to each other in a manner to vary their speed ratio without the intermeshing and attendant clashing of gears, thus providing an efficient and quietly operating transmission apparatus.

Obviously, the present invention is not limited to the precise construction and arrangement shown and described as the same may be variously modified. Moreover, all the features of the present invention need not be used conjointly as the same may be used to advantage in variously different combinations and sub-combinations.

What I claim and desire to secure by Letters Patent is:

1. In a device of the class described, the combination of a driving element, a driven element, a rotatable planetary member mounted on one of said elements and having its axis of rotation fixed with respect thereto, means for rotating said member, and means mounted on the other of said elements and movable with respect to said member and operatively related thereto for transmitting motion from said driving element to said driven element at variously increased or decreased speeds in one direction or another according to the position of said means with respect to said member.

2. In a device of the class described, the combination of a driving element, a driven element, a rotatable planetary cone-shaped member mounted on said driving element and having its axis of rotation fixed with respect thereto, means for rotating said member, and means mounted on said driven element and operatively related to said member in a manner to be driven thereby, said means being movable with respect to said member for driving said means and driven element in one direction or another according to the position of said means with respect to said member.

3. In a device of the class described, the combination of a driving element, a driven element, a rotatable planetary member mounted on said driving element and having its axis of rotation fixed in substantially parallel relation with respect thereto, means for rotating said member, and means mounted on said driven element and operatively related to said member in a manner to be driven thereby, said means being movable with respect to said member for driving said means and driven element at various speeds in one direction or another according to the position of said means with respect to said member.

4. In a device of the class described, the combination of a driving element, a driven element, a planetary member mounted on one of said elements, means for rotating said member, and radially movable protuberances mounted on the other of said elements and operatively related to said member in a manner to be driven thereby.

5. In a device of the class described, the combination of a driving element, a driven element, a planetary member mounted on one of said elements, means for rotating said member, and means comprising an expansible drum mounted on the other of said elements and operatively related to said member in a manner to be driven thereby in one direction or another.

6. In a device of the class described, the combination of a driving element, a driven element, a planetary member mounted on one of said elements, means for rotating said member, and a gear of variable pitch diameter having relatively movable teeth associated therewith mounted on the other of said elements and operatively related to said member in a manner to be driven thereby in one direction or another.

7. In a device of the class described, the combination of a driving element, a driven element, a planetary member mounted on one of said elements, means for rotating said member, and means including a plurality of spring actuated, radially and relatively movable protuberances mounted on the other of said elements and operatively related and movable with respect to said member in a manner to be driven thereby in one direction or another depending upon the position of said last-mentioned means with respect to said member.

8. In a device of the class described, the combination of a driving element, a driven element, a planetary member mounted on one of said elements, means for rotating said member, and means including a plurality of resilient fingers mounted on the other of said elements and operatively related to said member in a manner to be driven thereby for driving said driven element in the same direction as said driving element.

9. In a device of the class described, the combination of a driving element, a driven element, a planetary member mounted on one of said elements, means for rotating said member, and means including a plurality of resilient fingers mounted on the other of said elements and operatively related to said member in a manner to be driven thereby for driving said driven element in the same direction as said driving element or in the opposite direction with respect thereto.

10. In a device of the class described, the combination of a driving element, a driven element, a planetary member mounted on one of said elements, means for rotating said member, and means including a plurality of resilient annularly spaced fingers mounted on the other of said elements and operatively related to said member in a manner to be driven thereby for driving said driven element in the same direction as said driving element.

11. In a device of the class described, the combination of a driving element, a driven element, a planetary member mounted on one of said elements, means for rotating said member, means including a plurality of resilient annularly spaced fingers mounted on the other of said elements and operatively related to said member in a manner to be driven thereby for driving said driven element in the same direction as said driving element or in the opposite direction with respect thereto, and means for yieldingly maintaining said fingers in annular alignment with respect to each other.

12. In a device of the class described, the combination of a driving element, a driven element, a plurality of planetary members mounted on one of said elements, means for rotating said members, an expansible member comprising a plurality of overlapping fingers mounted on the other of said elements and engageable with said planetary members in a manner to be driven thereby, said expansible member being movable with respect to said planetary members in a manner to vary the speed ratio of the planetary members and expansible member for varying the speed of said driven element, and means for maintaining said fingers in overlapping relationship with respect to each other.

13. In a device of the class described, the combination of a driving element, a driven element, a plurality of planetary members mounted on said driving element, means for rotating said members, a radially expansible member comprising a plurality of yieldable overlapping fingers mounted on said driven element and engageable with said planetary members in a manner to be driven thereby, said expansible member being movable with respect to said planetary members in a manner to vary the speed ratio of the planetary members and expansible member for varying the speed of said driven element, and means for maintaining said fingers in overlapping relationship with respect to each other.

14. In a device of the class described, the combination of a driven element, a driving element, a plurality of planetary cone-shaped members mounted on said driving element, means for rotating said members, a radially expansible member comprising a plurality of yieldable overlapping fingers slidably mounted on said driven element and engageable with said planetary members in a manner to be driven thereby, said expansible member being movable with respect to said planetary members in a manner to engage their surfaces at various positions throughout their length and to vary the speed ratio of the planetary members and expansible member for varying the speed of said driven element, and means mounted on the respective fingers and cooperable with adjacent fingers for maintaining said fingers in overlapping relationship with respect to each other.

15. In a device of the class described, the combination of a driving element, a driven element, a plurality of annularly spaced planetary cone-shaped members mounted on said driving element, means for rotating said members, a radially expansible member comprising a plurality of yieldable overlapping substantially parallel fingers mounted on said driven element and engageable with said planetary members in a manner to be driven thereby, said expansible member being movable longitudinally of said planetary members in a manner to engage their surfaces at various positions throughout their length and to vary the speed ratio of the planetary members and expansible member for varying the speed of said driven element, and means mounted on the respective fingers and cooperable with adjacent fingers for maintaining said fingers in overlapping relationship with respect to each other.

16. In a device of the class described, the combination of a driving element, a driven element, a plurality of annularly spaced planetary cone-shaped members formed of yieldable material mounted on said driving element, a rack, means cooperable with said rack for rotating said members, a radially expansible drum having an open end portion and comprising a plurality of yieldable overlapping substantially parallel fingers slidably mounted on said driven element and engageable with said planetary members in a manner to be driven thereby, said drum being movable longitudinally of said planetary members in a manner to engage their surfaces at various positions throughout their length and to vary the speed ratio of the planetary members and drum for varying the speed of said driven element, and retaining means mounted on the respective fingers and cooperable with adjacent fingers and the retaining means on adjacent fingers for maintaining said fingers in overlapping relationship with respect to each other.

17. In a device of the class described, the combination of a driving element, a driven element, a plurality of planetary cone-shaped members mounted on said driving element, means for rotating said members, a collar mounted on said driving element, a drum mounted on said driven element and having an open end portion adapted to receive said members and collar in a manner to be driven thereby, said drum being longitudinally movable along said driven element into engagement with the surfaces of said members at various positions throughout their length to vary the speed ratio of the members and drum for varying the speed of said driven element, and into engagement with said collar for driving said driving element at the same speed as said driving element.

18. In a device of the class described, the combination of a driven element, a driving element, a plurality of rotatable planetary cone-shaped members mounted on said driving element and having their axes positioned in fixed relation with respect thereto, means for rotating said members, a collar mounted on said driving element, a drum mounted on said driven element and having an open end portion adapted to receive said members and collar in a manner to be driven thereby, said drum being longitudinally movable along said driven element into engagement with said members at various positions throughout their length to vary the speed ratio of the members and drum for varying the speed of said driven element, and into engagement with the periphery of said collar for driving said driven element at the same speed as said driving element.

19. In a device of the class described, the combination of a driving element, a driven element, a plurality of rotatable planetary cone-shaped members formed of yieldable material mounted on said driving element and having their axes positioned in fixed relation with respect thereto, means for rotating said members, a collar having a yieldable periphery mounted on said driving element, a drum mounted on said driven element and having an open end portion adapted to receive said members and collar in a manner to be driven thereby, said drum having annularly spaced protuberances on its inner side and being movable longitudinally along said driven element in a manner to cause said protuberances to engage said members at various positions throughout their length to vary the speed ratio of the members and drum for varying the speed of said driven element, and to cause said protuberances to engage the periphery of said collar for driving said driven element at the same speed as said driving element.

20. In a device of the class described, the combination of a driving element, a driven element, a plurality of rotatable planetary cone-shaped members mounted on said driving element and having their axes positioned in fixed parallel relation with respect thereto, means for rotating said members, a collar mounted on said driving element, the apexes of said members being positioned adjacent the periphery of said collar, an expansible drum mounted on said driven element and having an open end portion adapted to receive said members and collar in a manner to be driven thereby, said drum being longitudinally movable along said driven element into engagement with the surfaces of said members at various positions throughout their length to vary the speed ratio of the members and drum for varying the speed of said driven element, and into engagement with the periphery of said collar for driving said driven element at the same speed as said driving element.

21. In a device of the class described, the combination of a driving element, a driven element, a plurality of rotatable planetary cone-shaped members formed of yieldable material mounted on said driving element and having their axes positioned in fixed parallel relation with respect thereto, means for rotating said members, a collar having a yieldable periphery mounted on said driving element, the apexes of said members being positioned adjacent the periphery of said collar, an expansible drum mounted on said driven element and having an open end portion adapted to receive said members and collar in a manner to be driven thereby, said drum having annularly spaced protuberances on its inner side and being longitudinally movable along said driven element in a manner to cause said protuberances to engage said members at various positions throughout the length of the members to vary the speed ratio of the members and drum for varying the speed of said driven element, and to cause said protuberances to engage the periphery of said collar for driving said driven element at the same speed as said driving element.

22. In a device of the class described, the combination of a driven shaft, a driving shaft, a plurality of rotatable planetary cone-shaped members formed of yieldable material mounted on said driving shaft and having their axes positioned in fixed parallel relation with respect thereto, means for rotating said members, a collar having a yieldable periphery mounted on said driving shaft, a bracket rotatably fixed and slidably mounted on said driven shaft, an expansible drum comprising a plurality of annularly spaced substantially parallel resilient fingers secured adjacent one of their end portions to said bracket and having inwardly extending protuberances formed adjacent their opposite end portions, said drum having an open end portion adapted to receive said members and collar, means for moving said bracket longitudinally of said driven shaft in a manner to cause said protuberances to engage said members at various positions throughout the length of the members to vary the speed ratio of said members and drum for varying the speed and direction of rotation of said driven shaft, and to cause said protuberances to engage the periphery of said collar for rotating said driven shaft at the same speed as the rotation of said driving shaft.

23. In a device of the class described, the combination of a drive shaft, a driven element, a plurality of annularly spaced planetary cone-shaped members mounted on said shaft and having their axes of rotation fixed with respect thereto, an internal gear, pinions having a less pitch diameter than the greatest diameter of said members operatively related to the respective members and cooperable with said gear for rotating the members, a collar secured to said shaft, a bracket on said driven element, a plurality of resilient fingers mounted adjacent one of their end portions on said bracket, means for moving the free ends of said fingers into engagement with said members at various positions throughout the length of the members for driving said driven element at various speeds in either direction according to the position of engagement of said fingers with said members and for moving the free ends of the fingers into engagement with said collar for driving the driven element at the same speed as said shaft, and means operatively related to the fingers for urging their free ends toward said members and collar.

24. In a device of the class described, the combination of a drive shaft, a rotatable driven element positioned in substantially axial alignment with said shaft, a plurality of annularly spaced planetary cone-shaped members formed of yieldable material mounted on said shaft and having their axes of rotation fixed in substantially parallel relation with respect thereto, a stationary internal gear, pinions having a less pitch diameter than the greatest diameter of said members operatively related to the respective members and cooperable with said gear for rotating the members, a collar rigidly secured to said shaft and having a periphery of yieldable material, a bracket rotatably secured to and longitudinally movable on said driven element, a plurality of resilient fingers mounted adjacent one of their end portions on said bracket and annularly spaced around said driven element in substantially parallel relationship with respect thereto and to each other, inwardly projecting protuberances adjacent the opposite ends of said fingers, means for moving said bracket to cause said protuberances to engage and indent the yieldable material of said members at various positions throughout the length of the members for driving said driven element at various speeds in either direction according to the position of engagement of said protuberances with said members and for moving the bracket to cause the protuberances to engage and indent the yieldable material of said collar for driving the driven element at the same speed as said shaft, and means operatively related to the respective fingers for yieldingly urging said protuberances toward said members and collar.

25. In a device of the class described, the combination of a driving element, a driven element, a rotatable planetary cone-shaped member mounted on said driving element and having its axis of rotation fixed with respect thereto, means for rotating said member, and connecting means mounted on said driven element and movable into engagement with and relatively to said member in a manner to be driven thereby at various speeds in either direction according to the position of said means with respect to said member, said means being movable with respect to said member into a neutral position to permit the continued operation of said driving element without transmitting motion to said driven element.

26. In a device of the class described, the combination of a driving element, a driven element, a rotatable planetary cone-shaped member mounted on said driving element and having its axis of rotation fixed with respect thereto, means for rotating said member, and connecting means mounted on said driven element and movable into engagement with and relatively to said member in a manner to be driven thereby at various speeds in either direction according to the position of said means with respect to said member, said means being movable with respect to said member into a neutral position to permit the continued operation of said driving element while said member and connecting means are in engagement without transmitting motion to said driven element.

27. In a device of the class described, the combination of a driving element, a driven element, a rotatable planetary cone-shaped member mounted on said driving element and having its axis of rotation fixed with respect thereto, means for rotating said member, connecting means mounted on said driven element and movable into engagement with and relatively to said member in a manner to be driven thereby at various speeds in either direction according to the position of said means with respect to said member, said means being movable with respect to said member into a neutral position to permit the continued operation of said driving element without transmitting motion to said driven element, and means for locating and securing said connecting means in neutral position.

28. In a device of the class described, the combination of a driving element, a driven element, a rotatable planetary member mounted on one of said elements and having its axis of rotation fixed with respect thereto, and a toothed gear of variable pitch diameter mounted on the other of said elements and movable with respect to said member and operatively related thereto for transmitting motion from said driving element to said driven element at variously increased or decreased speeds in one direction or another according to the position of said gear with respect to said member.

29. A gear of variable pitch diameter comprising a plurality of annularly spaced teeth adapted to be carried by a rotatable element, and resilient means for yieldingly urging said teeth radially with respect to said element.

30. A gear of variable pitch diameter comprising a plurality of annularly spaced inwardly projecting teeth adapted to be carried by a rotatable element, and resilient means for yieldingly urging said teeth toward said element.

31. A gear of variable pitch diameter comprising a bracket adapted to be mounted on a rotatable element, a plurality of annularly spaced resilient fingers secured adjacent one of their end portions to said bracket, and teeth formed on the opposite end portions of the respective fingers.

32. In a device of the class described, the combination of a rotatable driving element, a driven element, a rotatable cone-shaped member having an axis of rotation fixed with respect to said driving element and operatively related thereto in a manner to be driven thereby, and a plurality of protuberances mounted on said driven element and operatively related to said member in a manner to be driven thereby and to provide a driving connection between said member and with the driven element.

33. In a device of the class described, the combination of a driving element, a driven element, a rotatable cone-shaped member mounted on one of said elements and having an axis of rotation fixed with reference to said driving element and operatively related thereto in a manner to be driven thereby, a gear of variable pitch diameter comprising a plurality of annularly spaced teeth mounted on the other of said elements, and means for moving said teeth toward said cone-shaped member.

In witness whereof, I hereunto subscribe my name this 19th day of January, A. D. 1931.

HAROLD L. JOYCE.